(12) United States Patent
Cho

(10) Patent No.: US 6,580,477 B1
(45) Date of Patent: Jun. 17, 2003

(54) LIQUID CRYSTAL DISPLAY INCLUDING AT LEAST TWO LIGHT GUIDING PLATES ARRANGED IN PARALLEL

(75) Inventor: Chun-Hyun Cho, Kyongki-do (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/631,766

(22) Filed: Aug. 3, 2000

(30) Foreign Application Priority Data

Aug. 3, 1999 (KR) ............................................. 99-31828

(51) Int. Cl.[7] ............................................. G02F 1/1335
(52) U.S. Cl. ............................. 349/65; 349/62; 349/58; 349/64; 362/31
(58) Field of Search ............................... 349/61–71, 58; 362/31, 27

(56) References Cited

U.S. PATENT DOCUMENTS

| | | | | |
|---|---|---|---|---|
| 5,046,826 A | * | 9/1991 | Iwamoto et al. ............... | 359/49 |
| 5,128,781 A | * | 7/1992 | Ohno et al. .................... | 359/48 |
| 5,202,950 A | * | 4/1993 | Arego et al. .................. | 385/146 |
| 5,659,410 A | * | 8/1997 | Koike et al. ................... | 349/82 |
| 5,664,873 A | * | 9/1997 | Kanda et al. .................. | 362/97 |
| 5,704,703 A | * | 1/1998 | Yamada et al. ................ | 362/27 |
| 6,241,358 B1 | * | 6/2001 | Higuchi et al. ................ | 362/31 |
| 6,334,690 B1 | * | 1/2002 | Ohkawa ....................... | 362/31 |

* cited by examiner

Primary Examiner—Toan Ton
Assistant Examiner—Andrew M Schechter
(74) Attorney, Agent, or Firm—McGuireWoods LLP; Hae-Chan Park

(57) ABSTRACT

A liquid crystal display of a large screen size, a slim thickness and light weight is disclosed. The liquid crystal display includes a light supply unit group having at least two light guiding plates arranged in parallel and at least one lamp unit coupled to one side of the light guiding plate. A light control element is mounted on an upper surface of the light supply unit group, and uniformly controls luminance between the light guiding plate and the lamp unit. A reflective plate is disposed on a rear surface of the light supply unit group and has a shape corresponding to the rear surface of the light supply unit group. A back light assembly includes a receiving container that receives the light supply unit group, the light control element, and the reflective plate.

11 Claims, 6 Drawing Sheets

LIQUID CRYSTAL DISPLAY INCLUDING AT LEAST TWO LIGHT GUIDING PLATES ARRANGED IN PARALLEL

BACKGROUND OF THE INVENTION

1. Field of the Invention

The present invention relates to a liquid crystal display (LCD), and more particularly to a liquid crystal display in which at least two or more light guiding plates are arranged in parallel, a lamp unit is disposed at one side of the light guiding plate or between the light guiding plates, thereby enhancing luminance of a large screen sized LCD, and enabling the LCD to have a uniform luminance and a compact size of a lighter weight.

2. Description of the Related Art

Generally, an LCD is a mostly used type of flat panel display. Especially, the small size, lighter weight and lower power consumption render the LCD to replace the traditional cathode ray tube (CRT).

To display an image on the LCD panel, the LCD needs a light source called as back light assembly.

The back light assembly comprises a lamp unit for generating light beams, a diffusion sheet disposed below the LCD panel, for diffusing light beams generated from the lamp unit, a light guiding plate having a wedge shape or a flat shape, for guiding the light beams generated from the lamp unit into whole surface of the light guiding plate, a reflecting plate disposed below the light guiding plate, for directing the leaked light from the light guiding plate toward the LCD panel and a receiving container called as mold frame and that receives the lamp unit, the diffusion sheet, the light guiding plate and the reflecting plate.

Recently, an LCD panel of 14 inch or larger diagonal size is being developed for a desk top computer as well as a notebook computer. Moreover, its application gains the popularity as the display in almost all of industries.

Then, although the development in the LCD technology is directed toward large-sized screen, the thickness of the LCD panel is not increased to a large degree. However, size and thickness of the back light assembly increase to a large degree as the screen size increases, and also increase the size of the light guiding plate.

In order to prevent the luminescence inconsistency, which may be inevitable as the LCD becomes large, the incident face of the light guiding plate becomes thicker. This increases the total area and weight of the light guiding plate, increasing the entire size and thickness of the LCD. This goes against the current trend of a slimmer and lighter LCD.

SUMMARY OF THE INVENTION

The present invention enables an LCD to have a large screen, a slimmer thickness and a lighter weight.

To achieve these and other advantages in accordance with the purpose of the present invention as embodied and broadly described, a liquid crystal display comprises: a light supply unit group having at least two light guiding plates arranged in parallel and at least one lamp unit coupled to one side of said light guiding plate; a light control element mounted on an upper surface of said light supply unit group, for uniformly controlling luminance between said light guiding plate and said lamp unit; a reflective plate disposed on a rear surface of said light supply unit group and having a corresponding shape to that of said rear surface of said light supply unit group; a back light assembly including a receiving container that receives said light supply unit group, said light control element, and said reflective plate; and a display unit mounted on said light control element and fixed by said receiving container.

In addition, a plurality of different shape and combinations of light guiding plate are disclosed. It can achieve a slimmer and lighter LCD with a large screen size.

BRIEF DESCRIPTION OF THE DRAWINGS

The above objects and other advantages of the present invention will become more apparent by describing in detail a preferred embodiment with reference to the attached drawings in which.

DETAILED DESCRIPTION OF THE PREFERRED EMBODIMENTS

Reference will now be made in detail to the preferred embodiments of the present invention, examples of which are illustrated in the accompanying drawings.

Hereinafter, a liquid crystal display according to the present invention is described more fully with reference to the accompanying drawings.

Figure 1:
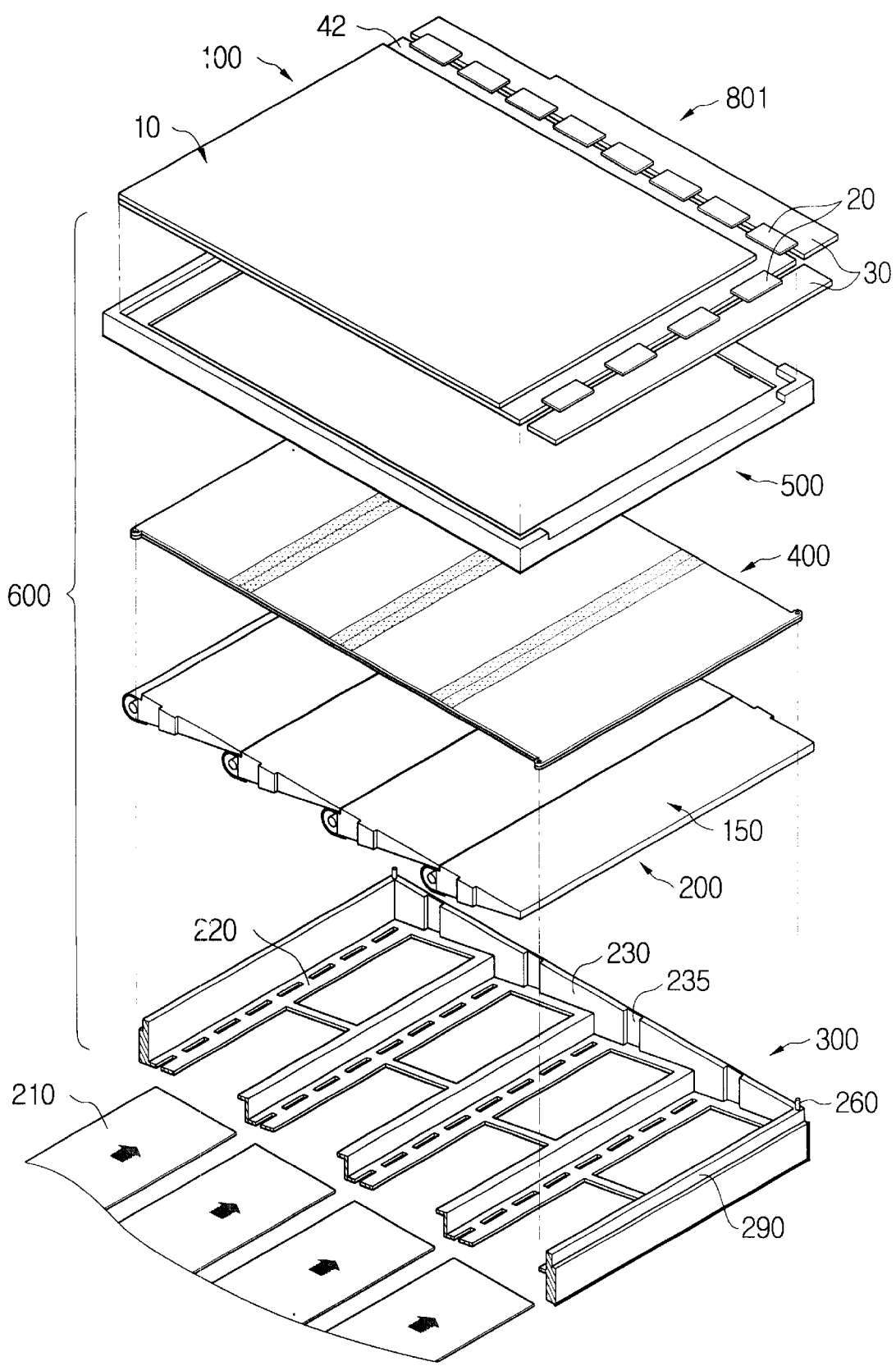
FIG. 1 is an exploded perspective view of the liquid crystal display according to a preferred embodiment of the present invention.

FIG. 1 is an exploded perspective view of the liquid crystal display according to a preferred embodiment of the present invention.

Referring to FIG. 1, the liquid crystal display 801 comprises a display unit 100, a back light assembly 600 and a chassis 700, on the whole.

The display unit 100 comprises a liquid crystal display (LCD) panel 10, a tape carrier package 20 and a printed circuit board (PCB) 30 having a driving signal generating part (not shown).

The LCD panel 10 includes a TFT substrate 2, a color filter substrate 4 and a liquid crystal layer interposed between the TFT substrate 2 and the color filter substrate 4.

The TFT substrate 2 includes a transparent glass substrate. On the transparent glass substrate, a plurality of thin film transistors (not shown) each including a gate, a source, and a drain are formed in a matrix arrangement by the semiconductor thin film formation process.

Source terminals of all the thin film transistors in one column are connected to a data line (not shown). Gate terminals of all the thin film transistors in a row are connected to a gate line. The drain terminal of each thin film transistor is connected to an ITO electrode, which is a pixel electrode.

The color filter substrate 4 includes a transparent glass substrate. The transparent glass substrate 4 has a lattice type black matrix (not shown), an RGB pixel (not shown) and a transparent and conductive ITO (Indium Thin Oxide) electrode. Here, the RGB pixels are formed by patterning a photoresist mixed with RBG pigment. The ITO electrode functions as a common electrode.

The liquid crystal layer interposed between the TFT substrate 2 and the color filter substrate 4 includes a plurality of liquid crystal molecules. The liquid crystal molecules are arranged at a pretilt angle when an electric filed is not applied between the pixel electrode and the common electrode. As the thin film transistors are turned on and an electric field is applied between the pixel electrode and the common electrode, the liquid crystal molecules are re-arranged depending on the intensity of the electric field, thereby passing incident light beams through the liquid crystal layer.

Thereafter, the light beams are collided with the RGB pixels of the color filter substrate 4 to display colors. The aforementioned procedure are very quickly and repeatedly conducted in a line unit or a dot unit, thereby displaying a desired image on the LCD panel.

Then, the liquid crystal layer itself is not the light emitting element but the light receiving element. So, in order to display an image with a desired high and uniform luminance, the LCD needs the back light assembly 600.

Referring to FIG. 1, the back light assembly 600 includes a light supply unit group 200, a mold frame 300 as a receiving container, optical sheets 400 and a display unit fixing cover 500.

Figure 2:
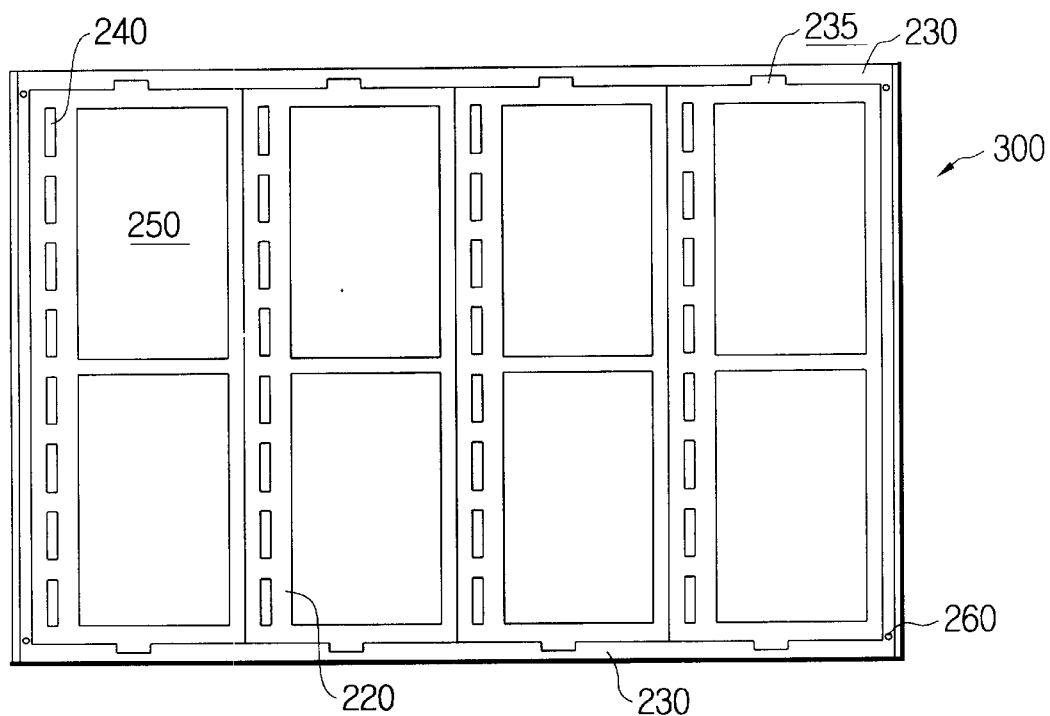
FIG. 2 is a plan view of the container in FIG. 1.
Figure 3:
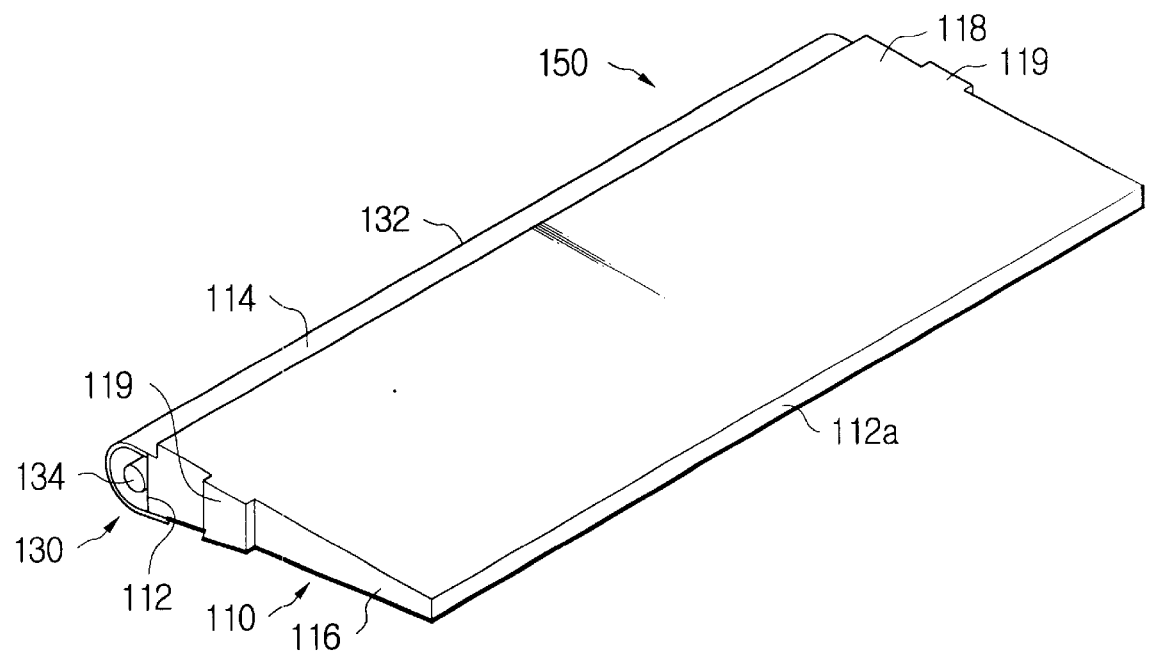
FIG. 3 is a perspective view of the light supply unit according to a preferred embodiment of the present invention.

Referring to FIG. 1 to FIG. 3, the light supply unit group 200 includes a plurality of light supply units 150, each having a light guiding plate 110 and a lamp unit 130.

The light guiding plate 110 is a rectangular shape when it is viewed from the top and is a wedge type in which its thickness decreases as it travels from one edge to the other edge facing the one edge. Here, a side wall 112 corresponding to the one edge where the light guiding plate is relatively thick serves as an incident face. An upper edge of the side wall perpendicular to the side wall serving as light incident face has a stepped portion 114. The light guiding plate 110 also has side walls 116 and 118 facing each other. Each of the side walls 116 and 118 has a swaying preventive projection 119 projected from the surface thereof by a selected height. It is preferable that the projection 119 is made to have a rectangular parallelepiped shape. The projection 119 is coupled to the receiving container 300 to prevent the light guiding plate 110 from being unnecessary sway.

Beneath the light guiding plate 110, a reflective layer (or a reflective dot) is formed by a silk screen method in order to further increase the luminance.

The lamp unit 130 includes a lamp cover 132 having a semi-cylindrical shape and a lamp 134 installed within the lamp cover 132. The lamp cover 134 is fixed to the side wall 112 serving as the light incident face using various gluing ways.

Although the aforementioned embodiment shows and describes a light supply unit having only a single lamp, the light supply unit 150 can have at least two lamps.

FIG. 1 shows the light supply unit group 200 in which four light supply units are coupled to each other. As shown in FIG. 1, the other edge of each of the light supply units 150 of the light supply unit group 200 is mounted on the stepped portion 114 of the light incident face 112 of adjacent light supply unit and is coupled thereto.

Unlike the aforementioned fabrication method of the light supply unit group 200, the light supply unit group 200 can be also fabricated by an injection molding. When the injection molding method is used for the formation of the light supply unit group 200, it is not appropriate to form the reflective layer on the rear surface of the light guiding plate 110 using the silk screen method because the rear surface is not flat. So, when the injection molding method is applied, a bottom surface of the mold used in the injection molding is corroded to have a rough surface functioning as the reflective layer. Thereafter, the lamp unit 130 is coupled to the fabricated light supply unit group 200.

For the assembly, a reflecting plate 210 is received in the receiving container 300 and the light supply units group 200 is then received on the reflecting plate within the receiving container 300.

As shown in FIG. 1 and FIG. 2, the receiving container 300 is a rectangular parallelepiped shape in which an upper surface is open and has a space where the light supply units group 200 is received.

After the light supply units group 200 is assembled with the receiving container 300, an upper surface of the light supply unit group 200 should be leveled. Therefore, a bottom surface 220 of the receiving container 300 has a saw tooth structure such that it is properly coupled with the rear surface of the light supply unit group 200.

In the aforementioned embodiment, the light supply unit group 200 is made up of four light supply units 150. Accordingly, the rear surface of the receiving container 300 comes to have four saw tooth.

Meanwhile, as shown in FIG. 1 and FIG. 2, the receiving container 300 has a projection fixing groove 235 at a place corresponding to the swaying preventive projection 119 of the light supply unit group 200. The projection fixing groove 235 is coupled with the swaying preventive projection 119 when assembling the light supply unit group 200 with the receiving container 300.

When such constructed LCD operates, the lamp unit 134 of the light supply unit group 200 emits a lot of heat. In order to prevent the heat-induced efficiency degradation of the lamp 134, the receiving container 300 has at least one heat irradiation hole 240 as shown in FIG. 2.

The receiving container 300 also includes a plurality of openings 250 at its bottom, each of the openings having a rectangular plate shape. The openings 250 lightens the receiving container 300.

On the light supply unit group 200 coupled to the receiving container 300, at least one, preferably three diffusion sheets 400 are mounted.

The diffusion sheets 400 should be fixed to the receiving container 300 such that although the receiving container 300 is swayed or the diffusion sheets 400 are expanded by heat in a state where the light supply units group 200 is coupled to the receiving container 300, the diffusion sheets 400 can withstand the sway or heat expansion.

To this end, bosses 260 for fixing the diffusion sheets 400 are formed at four corners of the receiving container 300. Here, it is desirous that the boss 260 has a height greater than total thickness of the three diffusion sheets 400.

Figure 4A:
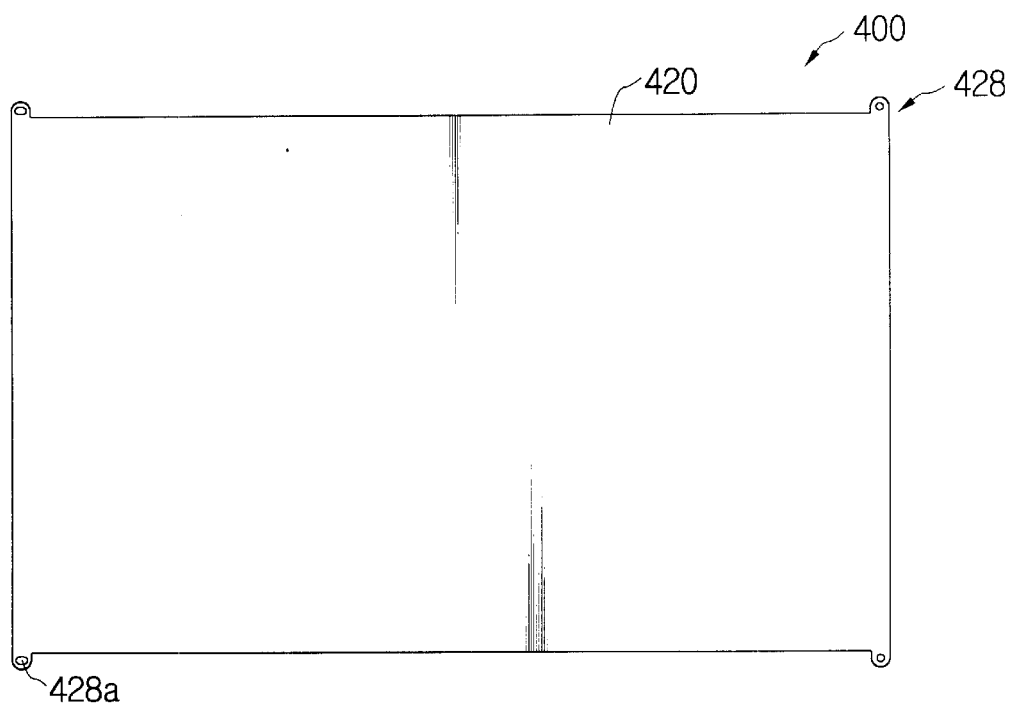
FIG. 4a is a plan view of the second diffusion sheet according to a preferred embodiment of the present invention and FIG. 4b is a plan view of the first diffusion sheet according to a preferred embodiment of the present invention.
Figure 4B:
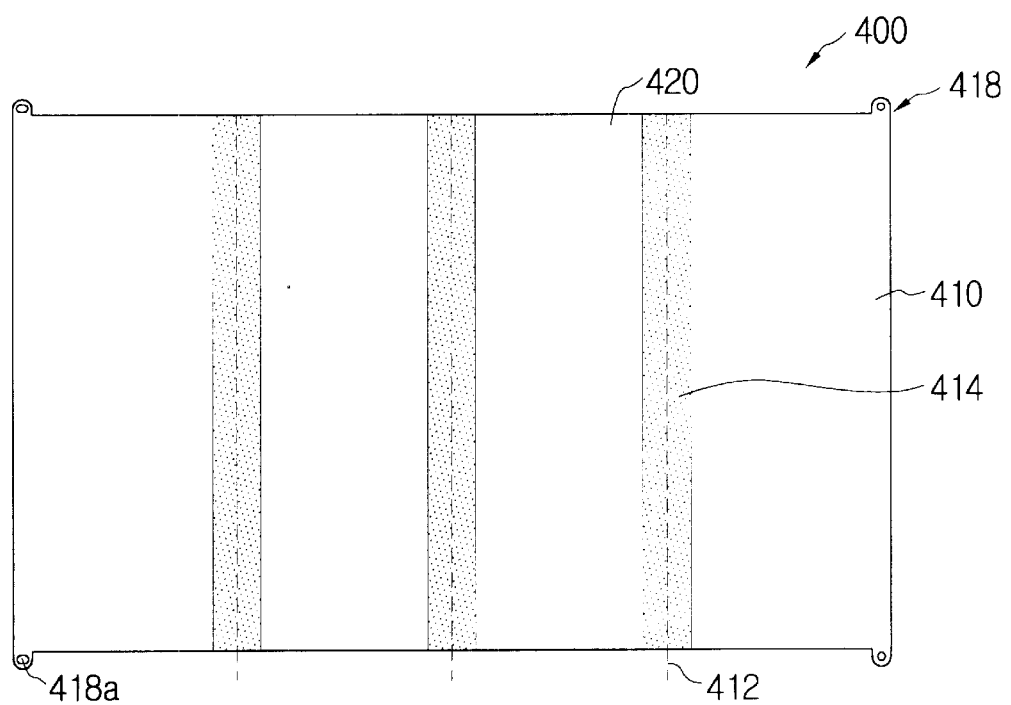

For example, when the diffusion sheets 400 are three, the diffusion sheets 400 are classified into a first diffusion sheet 410 shown in FIG. 4b and a second diffusion sheet 420 shown in FIG. 4a.

The first diffusion sheet 410 is one sheet and contacts to the upper surface of the light supply units group 200. The second diffusion sheet 420 is remaining two sheets from among the three diffusion sheets 400 and is mounted on the upper surface of the first diffusion sheet 410.

Referring to FIG. 4b, the first diffusion sheet 410 comprises a reflective member 414 formed at the boundary between the light supply units 150 to prevent the non-uniform luminance at the boundary and induce scattered reflection. The reflective member 414 is formed by silk screen method.

The second diffusion sheet 420 shown in FIG. 4a again diffuses the light beams reflected irregularly by the first diffusion sheet 410 to thereby increase the luminance uniformity.

The first and second diffusion sheets 410 and 420 each is comprised of projections 418 and 428 having a coupling hole 418a and 428a at four corners thereof. The coupling hole 418a and 428a is inserted into the bosses 260 formed at four corners of the receiving container 300. Here, the coupling hole 418a and 428a has a specific structure considering the expansion of the diffusion sheets 400 by heat.

Specifically, in a state that image is normally displayed, a reference coupling hole is disposed at the left upper corner of the diffusion sheet 400 and has a diameter to such a degree that it is inserted into the boss 260 of the receiving container 300.

Also, in the state that image is normally displayed, a coupling hole disposed at the left lower corner has a shape of an ellipse in which a horizontal diameter is greater than a vertical diameter. The elliptical coupling hole allows the diffusion sheet 400 to be expanded only along the horizontal direction when the diffusion sheet 400 is expanded by the heat.

The remaining two coupling holes disposed at the right upper and lower portions of the diffusion sheets have some tolerance compared with the diameters of the corresponding bosses.

When the above constituted diffusion sheet 400 is coupled to the boss 260 of the receiving container 300 to which the light supply units group 200 has been coupled, the diffusion sheet 400 is hardly swayed along the left and right directions while it can be easily taken off from the boss 260.

Thus, in order to prevent the diffusion sheet 400 and the light supply units group 200 from being taken off and to fix the display unit 100, a display unit fixing cover 500 covers the receiving container 300.

Figure 5:
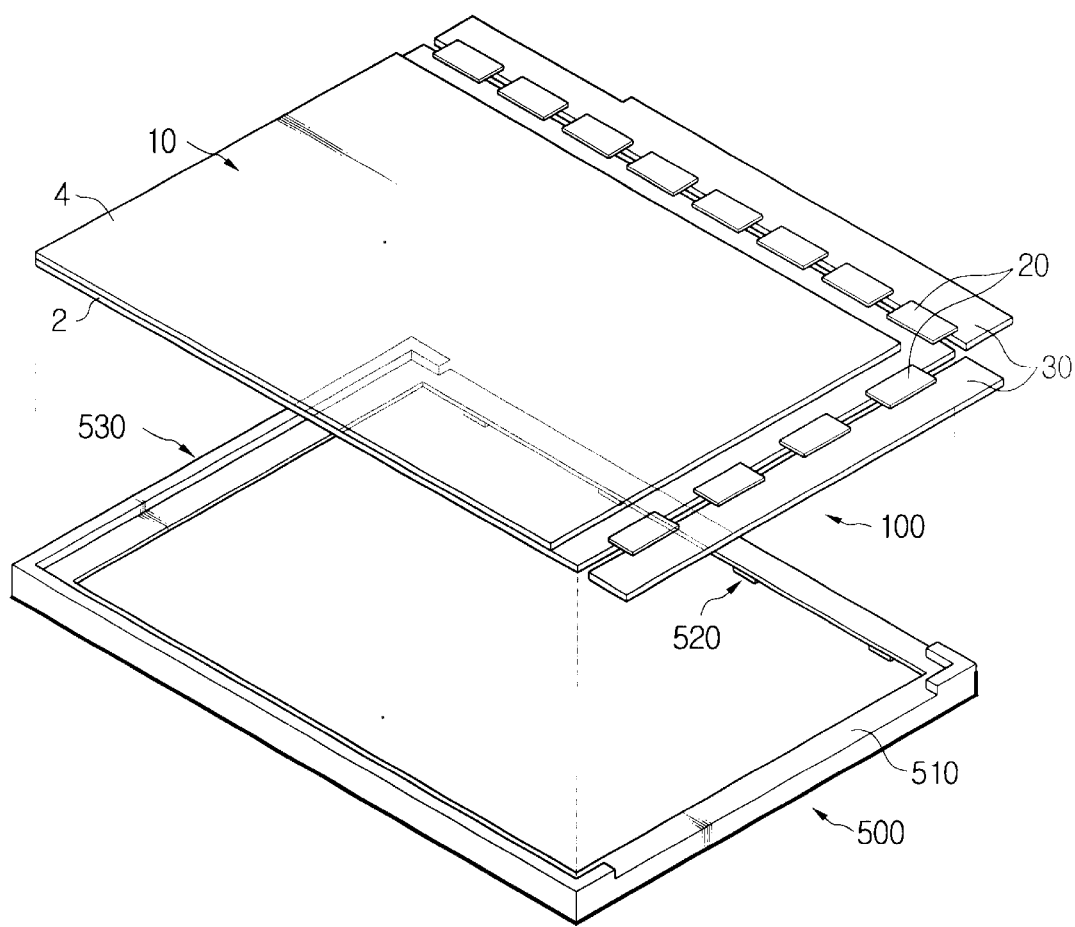
FIG. 5 is an exploded perspective view showing the coupling relationship between the display unit fixing cover and the liquid crystal display panel.

As shown in FIG. 5, the display unit fixing cover 500 is a rectangular frame and is coupled to the receiving container 300. Here, the receiving container 300 has a stepped portion 290 at an outer upper portion of the side wall such that the unit fixing cover 500 is rigidly coupled to the receiving container 300.

The display unit fixing cover 500 has a pushing piece 520 pushing the swaying preventive projection 119 at its inner lower portion such that the light guiding plate 110 of the light supply unit group 200 coupled to the receiving container 300 does not deviate from the outside.

The display unit fixing cover 500 has a guide 530 for guiding the display unit 100 at a proper position during the assembly of the display unit 100. The guide 530 is partially formed along the upper edge including three corners of the display unit fixing cover 500. Two edge portions of the display unit fixing cover 500 that do not have the guide 530 is provided for bending the PCB 30. In other words, the two edge portions allow the PCB 30 to be easily bent toward the rear face of the display unit fixing cover 500.

Here, it is desirous that the bent PCB 30 should be bent toward the thinner portion of the light guiding plate 112a shown in FIG. 3. This is to prevent that semiconductor chips of tape carrier packages 20 are degenerated by the heat of the lamp unit 130 when the PCB 30 is bent to place at the lamp unit portion of the light supply unit group 200.

Figure 6:
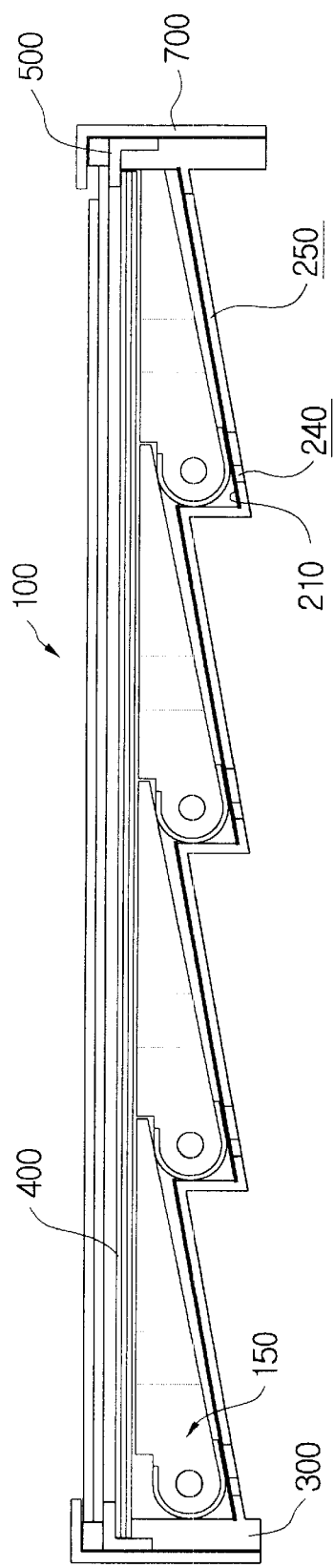
FIG. 6 is a sectional view taken along the line 6–6' after assembling elements of FIG. 1.

In a state where the display unit 100 is coupled to the display unit fixing cover 500, in order to prevent the display unit 100 from deviating from the display unit fixing cover 500, to enhance a coupling force between the display unit fixing cover 500 and the receiving container 300, and to protect the display unit from an external impact, a chassis 700 is coupled and fixed to the display unit fixing cover 500 and the receiving container 300 as shown in FIG. 6.

Figure 7:
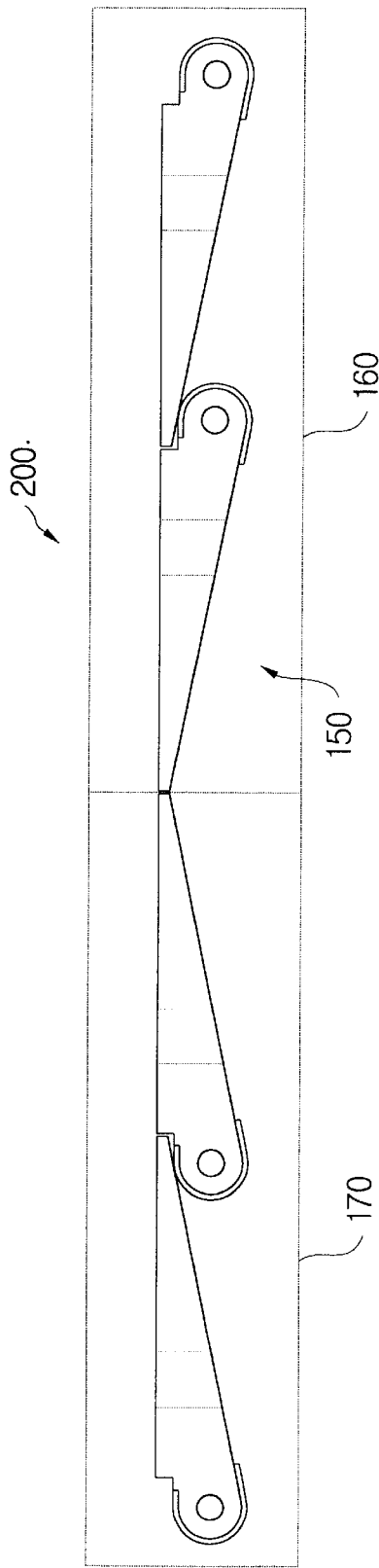
FIG. 7 is a schematic view of the light supply unit group according to another embodiment of the present invention.

FIG. 7 shows the light supply units group 200 according to another embodiment of the present invention. Here, other elements expect the light supply units group can be identically applied to the present LCD. Accordingly, their descriptions are intentionally omitted.

Referring to FIG. 7, two light supply units group 160 and 170 are shown. Each of the light supply unit groups has two light supply units coupled to each other in the same way as described in FIG. 1 to FIG. 5. The two light supply unit groups 160 and 170 are coupled to each other such that thinner portion of unit light supply unit of one light supply unit group faces with thinner portion of unit light supply unit of the other light supply unit group. At this time, the bottom portion of the receiving container 300 should have such a structure capable of receiving the above constructed light supply unit group 200.

Figure 8:
FIG. 8 and FIG. 9 are schematic views of the light supply unit group according to still another embodiments of the present invention.

FIG. 8 shows the light supply units group according to still another embodiment of the present invention.

Referring to FIG. 8, the light supply unit group 940 comprises at least two flat light guiding plates 910 arranged in parallel and a lamp unit 920 disposed at one edge of the light guiding plate 910 or between the light guiding plates 910.

Like the previous embodiments, the bottom portion of the receiving container 300 should have such a structure capable of receiving the light supply unit group 940.

Figure 9:
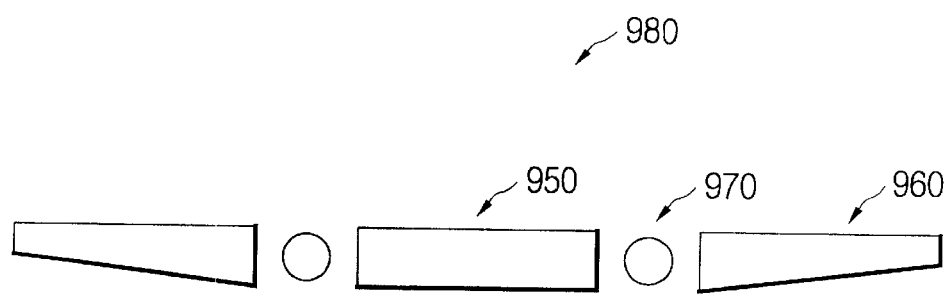

FIG. 9 shows the light supply unit group 980 according to further still another embodiment of the present invention.

Referring to FIG. 9, the light supply units group 980 comprises a flat-type light guiding plate 950 disposed at the center portion, wedge-type light guiding plates 960 disposed at both sides of the flat-type light guiding plate 950 and a lamp unit 970 disposed between the flat-type light guiding plate 950 and the wedge-type light guiding plates 960.

Likewise the previous embodiments, the bottom portion of the receiving container 300 should have such a structure capable of receiving the light supply unit group 980.

As described above, the present invention can provide a liquid crystal display having high and uniform luminance by forming a light supply unit group comprising a plurality of light guiding plates and a lamp unit disposed therebetween.

Moreover, using the wedge-type light guiding plate and connecting plural wedge-type light guiding plates, the light guiding plate becomes lighter, although the screen size becomes large.

Further, since the heat generated from the lamp unit is effectively radiated to the outside, the degeneration of the semiconductor chips mounted on the PCB and the tape carrier packages can be prevented.

While the present invention has been described in detail, it should be understood that various changes, substitutions and alterations can be made hereto without departing from the spirit and scope of the invention as defined by the appended claims.

What is claimed is:

1. A liquid crystal display comprising:
   a light supply unit group having at least two light guiding plates arranged in parallel and at least one lamp unit coupled to one side of one of said light guiding plates;
   a light control element mounted on an upper surface of said light supply unit group, for controlling luminance uniformity between said light guiding plate and said lamp unit;
   a reflective plate disposed on a rear surface of said light supply unit group and having a corresponding shape to that of said rear surface of said light supply unit group:
   a back light assembly including a receiving container that receives said light supply unit group, said light control element, and said reflective plate; and
   a display unit mounted on said light control element and fixed by the receiving container,
   wherein said light supply unit group comprises a plurality of light supply units, each of said light supply units comprising:
      a light guiding plate having a wedge-type rectangular parallelepiped shape in which its thickness decreases as it travels from one edge to the other edge facing said one edge, said light guiding plate having a stepped portion formed at an upper edge of said one edge and a patterned reflective layer formed on a rear surface of said light guiding plate; and
      a light supply unit having a lamp unit including a lamp cover and a lamp, said lamp unit being coupled to said one edge of said light guiding plate,
   wherein a thinner end portion of one of said light guiding plates is mounted on said stepped portion where said lamp unit is coupled.

2. The liquid crystal display of claim 1, wherein said light control element further comprises:
   a first sheet having a reflective member formed at a portion corresponding to a boundary between adjacent light guiding plates, for enhancing luminance uniformity; and
   a second sheet mounted on said first sheet and having at least one sheet for diffusing light passing through said first sheet.

3. The liquid crystal display of claim 1, wherein said light supply unit group and said light control element are fixed to a rear face of a fixing cover coupled to said receiving container and said display unit is fixed to a front face of said fixing cover.

4. A liquid crystal display comprising:
   a light supply unit group having at least two light guiding plates arranged in parallel and at least one lamp unit coupled to one side of one of said light guiding plates;
   a light control element mounted on an upper surface of said light supply unit group, for controlling luminance uniformity between said light guiding plate and said lamp unit;
   a reflective plate disposed on a rear surface of said light supply unit group and having a corresponding shape to that of said rear surface of said light supply unit group:
   a back light assembly including a receiving container that receives said light supply unit group, said light control element, and said reflective plate; and
   a display unit mounted on said light control element and fixed by the receiving container,
   wherein said light supply unit group comprises a first light supply unit group and a second light supply unit group, each of said first light supply unit group and said second light supply unit group comprises:
      a light guiding plate having a wedge-type rectangular parallelepiped shape in which its thickness decreases as it travels from one edge to the other edge facing said one edge, said light guiding plate having a stepped portion formed at an upper edge of said one edge and a patterned reflective layer formed on a rear surface of said light guiding plate; and
      a light supply unit having a lamp unit including a lamp cover and a lamp, said lamp unit being coupled to said one edge of said light guiding plate,
   wherein a thinner end portion of one of said light guiding plates is mounted on said stepped portion where said lamp unit is coupled, and
   wherein said first light supply unit group is connected to said second light supply unit group such that a thinner end portion of said first light supply unit group faces with a thinner end portion of said second light supply unit group.

5. The liquid crystal display of claim 4, wherein said light guiding plate comprises a swaying preventive projection formed at a side wall of said light guiding plate perpendicular to said lamp unit.

6. The liquid crystal display of claim 5, wherein said receiving container has a rectangular parallelepiped shape whose upper surface is open and bottom surface has a shape matching the shape of the rear surface of the light supply unit group, which has a space where the light supply unit group is received, and
   wherein said receiving container comprises:
      a projection coupling groove formed at a corresponding portion to said swaying preventive projection and coupled to said swaying preventive projection;
      a heat radiation hole formed at a portion corresponding to said lamp unit, for radiating heat generated from the lamp unit;
      an opening formed at a remaining portion except for said heat radiation hole, for decreasing weight of the receiving container, and
      a fixing projection formed at a corner of the receiving container and projected by a predetermined height, for fixing said light control element diffusion.

7. A liquid crystal display, comprising:
   a light supply unit group having at least two flat light guiding plates arranged in parallel and at least one lamp unit coupled to one side of one of the flat light guiding plates;
   a light control element mounted on an upper surface of said light supply unit group, for controlling luminance uniformity between the flat light guiding plate and the lamp unit;
   a reflective plate disposed on a rear surface of said light supply unit group and having a shape corresponding to rear surface of said light supply unit group;
   a back light assembly including a receiving container that receives said light supply unit group, said light control element, and said reflective plate; and
   a display unit mounted on said light control element and fixed by said receiving container, wherein said light control element comprising a first sheet having a reflective member formed at a portion corresponding to a boundary between adjacent light guiding plates for enhancing luminance uniformity.

8. The liquid crystal display of claim 7, wherein said light supply unit group further comprises two wedge type light guiding plates, and said at least two flat light guiding plates are arranged between said two wedge type light guiding plates in parallel.

9. A liquid crystal display, comprising:
a light supply unit group having a flat-type light guiding plate, a wedge-type light guiding plate coupled to the flat-type light guiding plate and at least one lamp unit coupled to one side of either flat-type light guiding plate or wedge-type light guiding plate, wherein the flat-type light guiding plate and the wedge-type light guiding plate are arranged in parallel;
a light control element mounted on an upper surface of said light supply unit group, for controlling luminance uniformity between said light guiding plate and said lamp unit;
a reflective plate disposed on a rear surface of said light supply unit group and having a shape corresponding to rear surface of said light supply unit group;
a back light assembly including a receiving container that receives said light supply unit group, said light control element, and said reflective plate; and
a display unit mounted on said light control element and fixed by the receiving container.

10. The liquid crystal display of claim 9, wherein a thick side of the wedge-type light guiding plate faces one side of the flat-type light guiding plate and the lamp unit is disposed between said one side of the flat-type light guiding plate and the thick side of the wedge-type light guiding plate.

11. The liquid crystal display of claim 9, wherein the flat-type light guiding plate is at least two arranged in parallel.

* * * * *